(12) United States Patent
Cheng (10) Patent No.: US 10,514,779 B2
(45) Date of Patent: Dec. 24, 2019

(54) SYSTEM AND METHOD FOR MEASURING ASSOCIATION BETWEEN SCREEN RESOLUTION AND MOUSE MOVEMENT SPEED, RECORDING MEDIUM, AND COMPUTER PROGRAM PRODUCT

(71) Applicant: National Central University, Taoyuan (TW)

(72) Inventor: Yung-Pin Cheng, Taipei (TW)

(73) Assignee: National Central University, Taoyuan (TW)

( * ) Notice: Subject to any disclaimer, the term of this patent is extended or adjusted under 35 U.S.C. 154(b) by 87 days.

(21) Appl. No.: 15/793,285

(22) Filed: Oct. 25, 2017

(65) Prior Publication Data
US 2018/0196532 A1 Jul. 12, 2018

(30) Foreign Application Priority Data
Jan. 10, 2017 (TW) .............................. 106100715 A (51) Int. Cl.
*G06F 3/0354* (2013.01)
*G06F 3/03* (2006.01)
*G06F 3/038* (2013.01)
*G09G 5/08* (2006.01)
(Continued)

(52) U.S. Cl.
CPC .......... *G06F 3/03543* (2013.01); *G06F 3/038* (2013.01); *G06F 3/0317* (2013.01); *G06F 3/0325* (2013.01); *G09G 5/08* (2013.01); *G06F 3/0346* (2013.01); *G06F 3/04892* (2013.01);
(Continued)

(58) Field of Classification Search
CPC .... G06F 3/038; G06F 3/03543; G06F 3/0317; G06F 3/04883; G06F 3/0383; G06F 3/03547; G06F 3/0481; G06F 2203/0333; G06F 2203/0384
See application file for complete search history.

(56) References Cited

U.S. PATENT DOCUMENTS 5,877,748 A 3/1999 Redlich
6,433,780 B1 8/2002 Gordon et al.
(Continued)

FOREIGN PATENT DOCUMENTS

TW 200723073 6/2007
TW I333158 11/2010

OTHER PUBLICATIONS

Search Report for Taiwan Patent Application No. 106100715, completed May 25, 2017.

*Primary Examiner* — Dong Hui Liang
(74) *Attorney, Agent, or Firm* — Ferguson Case Orr Paterson (57) ABSTRACT

The present disclosure relates to a method for measuring an association between a screen resolution and a mouse movement speed. Steps in the method may include reading of a mouse speed table by a recording, playback, and verification module; converting a screenshot into a screenshot image file of a cursor and sending the screenshot image file to the recording, playback, and verification module, reading a destination position; calculating a minimum number of sets of a movement amount and a number of movements; and moving the cursor on the screen to the destination position according to the minimum number of sets of a movement amount and a number of movements.

7 Claims, 6 Drawing Sheets

(51) Int. Cl.
*G06F 3/0346* (2013.01)
*G06F 3/0489* (2013.01)
(52) U.S. Cl.
CPC . *G09G 2320/0693* (2013.01); *G09G 2340/04* (2013.01)

(56) References Cited

U.S. PATENT DOCUMENTS

2013/0076628 A1\* 3/2013 Lin ..................... G06F 3/03543
 345/163
2015/0002397 A1\* 1/2015 Song ................... G06F 3/03543
 345/163
2015/0301622 A1\* 10/2015 Chen ..................... G06F 16/955
 345/159

\* cited by examiner

FIG. 4(Continuation)

SYSTEM AND METHOD FOR MEASURING ASSOCIATION BETWEEN SCREEN RESOLUTION AND MOUSE MOVEMENT SPEED, RECORDING MEDIUM, AND COMPUTER PROGRAM PRODUCT

BACKGROUND

Technical Field

The present invention relates to the technical field of computers, and in particular, to a system and method for measuring an association between a screen resolution and a mouse movement speed, a recording medium, and a computer program product.

Related Art

Some software systems (such as a test automation tool and an online ticket purchase robot) may achieve various purposes by replacing humans to operate a mouse and a keyboard, and intercepting or skimming a mouse behavior is one of the necessary means.

Intercepting a mouse behavior to learn a current position of a mouse cursor on a screen is generally performed by depending on an application programming interface (API) provided by an operation system. A main technology is performed by using a hook technology of the operating system. Therefore, a technology of intercepting a mouse behavior must generally depend on an operating system, and practice thereof is closely related to the operating system.

However, a mouse behavior intercepted by using the operating system would generally cause severe interference on execution of the system, which not only reduces efficiency, but also often causes distortion in skimming and representing the mouse behavior.

SUMMARY

In view of the foregoing problems, an objective of the present invention is to provide a system and method for measuring an association between a screen resolution and a mouse movement speed, a recording medium, and a computer program product, in a case of not relating to an operating system platform, a mouse Universal Serial Bus (USB) signal is simulated by using special hardware, an image processing and analyzing technology is used to calculate an accurate association between a screen resolution and a mouse movement speed by regularly moving the mouse and observing changes of a position of a mouse cursor, so as to achieve an object of accurately moving the mouse cursor to a specific position.

A first aspect of the present invention provides a method for measuring an association between a screen resolution and a mouse movement speed, where a recording, playback, and verification module executes a mouse behavior event instruction of a mouse behavior event file, including the following steps:

A. reading, by the recording, playback, and verification module, a mouse speed table, where the mouse speed table includes a plurality of sets of a movement amount and a number of movements;

B. sending, by the recording, playback, and verification module, a starting point position to a to-be-tested system by using a Universal Serial Bus (USB) apparatus simulator to move a cursor on a screen of the to-be-tested system to the starting point position;

C. sending, by the recording, playback, and verification module, an image capturing signal to an image capturing module, and capturing, by the image capturing module on the to-be-tested system, a screenshot of moving the cursor to the starting point position and converting the screenshot into a screenshot image file of moving the cursor to the starting point position to send the screenshot image file to the recording, playback, and verification module;

D. sending, by the recording, playback, and verification module, a set of a movement amount and a number of movements in the mouse speed table to the to-be-tested system by using the USB apparatus simulator to enable the to-be-tested system to move, according to the set of a movement amount and a number of movements, the cursor on the screen to a destination position;

E. sending, by the recording, playback, and verification module, an image capturing signal to the image capturing module, and capturing, by the image capturing module on the to-be-tested system, a screenshot of moving the cursor to the destination position and converting the screenshot into a screenshot image file of moving the cursor to the destination point position to send the screenshot image file to the recording, playback, and verification module;

F. comparing, by the recording, playback, and verification module, the screenshot image file in which the cursor is moved to the starting point position with the screenshot image file in which the cursor is moved to the destination position, and learning, according to a movement distance of the cursor between the starting point position and the destination position, a mouse movement distance and an average mouse movement distance, corresponding to the set of a movement amount and a number of movements, of the movement distance, where each mouse movement distance is divided by a corresponding number of movements to obtain each average mouse movement distance;

G. repeating step B to step F, so as to obtain and establish a mouse movement distance and an average mouse movement distance that correspond to each set of a movement amount and a number of movements in the mouse speed table; and H. executing, by the recording, playback, and verification module, the mouse behavior event instruction according to the mouse speed table, so as to test the to-be-tested system.

A second aspect of the present invention provides a system for measuring an association between a screen resolution and a mouse movement speed, including:

a recording, playback, and verification module, which reads a mouse speed table and outputs data in the mouse speed table to a to-be-tested system;

an image capturing module, electrically connected to the recording, playback, and verification module and the to-be-tested system; and a USB apparatus simulator, electrically connected to the recording, playback, and verification module and the to-be-tested system;

where the recording, playback, and verification module, the image capturing module, and the USB apparatus simulator execute the method according to the first aspect.

A third aspect of the present invention provides a recording medium storing a program, where after loading and executing the program on the recording medium, a system for measuring an association between a screen resolution and a mouse movement speed implements the method according to the first aspect of the present invention.

A fourth aspect of the present invention provides a computer program product storing a program, where after loading and executing the program on the computer program product, a system for measuring an association between a screen resolution and a mouse movement speed implements the method according to the first aspect of the present invention.

DETAILED DESCRIPTION

In order to enable persons of ordinary skill in the art of the present invention to further understand the present invention, preferred embodiments of the present invention are specifically provided in the following text and the constitution content and to-be-produced effects of the present invention are described in detail with reference to the accompanying drawings.

The implementation content of the present invention refers to the content of an earlier application the Applicant of the present invention, which has a patent application Ser. No. 10/511,4284, is entitled "SYSTEM AND METHOD FOR RECORDING AND PLAYING BACK MOUSE BEHAVIOR, RECORDING MEDIUM, AND PROGRAM PRODUCT", and discloses establishing and executing a mouse behavior event file.

Figure 1:
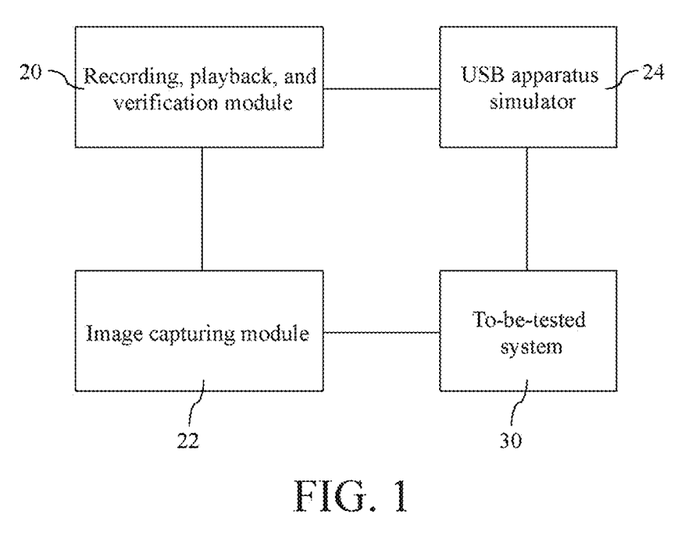
FIG. 1 is a block diagram of a system for measuring an association between a screen resolution and a mouse movement speed according to the present invention.

FIG. 1 is a block diagram of a system for measuring an association between a screen resolution and a mouse movement speed according to the present invention. In FIG. 1, a system for measuring a screen resolution and a mouse movement speed includes a recording, playback, and verification module 20, an image capturing module 22, and a Universal Serial Bus (USB) apparatus simulator 24. The image capturing module 22 is electrically connected to the recording, playback, and verification module 20 and a to-be-tested system 30. The USB apparatus simulator 24 is electrically connected to the recording, playback, and verification module 20 and the to-be-tested system 30.

The recording, playback, and verification module 20 reads a horizontal-direction moving mouse speed table and a vertical-direction moving mouse speed table (as shown in Table 1) and outputs data in the horizontal-direction moving mouse speed table and the vertical-direction moving mouse speed table to a to-be-tested system 30. The horizontal-direction moving mouse speed table and the vertical-direction moving mouse speed table respectively have a plurality of sets of movement amounts and numbers of movements (as shown in (tick, times) of Table 1), a plurality of mouse movement distances (such as L1, L2, . . . , L9 in Table 1), and a plurality of average mouse movement distances (such as L1/60, L2/30, . . . , L9/1 in Table 1) of horizontal direction movements and vertical direction movements.

TABLE 1

| (tick, times) | (1, 60) | (2, 30) | (4, 15) | (8, 20) | (16, 10) | (32, 5) | (64, 4) | (128, 2) | (255, 1) |
|---|---|---|---|---|---|---|---|---|---|
| Mouse movement distance related to a starting point position | L1 | L2 | L3 | L4 | L5 | L6 | L7 | L8 | L9 |
| Mouse average movement distance of (tick, 1) | L1/60 | L2/30 | L3/15 | L4/20 | L5/10 | L6/5 | L7/4 | L8/2 | L9/1 |

When a mouse sends a signal packet to a computer, the signal packet has a signal field, referred to as a tick (a movement amount), and a value of the tick may range from 0 to 255. When the mouse sends a signal of tick=1 to the computer, the cursor on the screen relatively moves by one distance L. Therefore, theoretically, if the mouse sends the signal of tick=1 for T times, a movement distance of the cursor on the screen is close to T*L. Accordingly, the mouse may also send the signal of tick=T once, and theoretically, a movement distance of the cursor on the screen is also close to T*L. However, in practice, such a linear deduction is incorrect, that is, a relationship between a mouse speed and a sent USB signal is a nonlinear relationship, so a concept, referred to as a movement, is used in the present invention. It should be noted that because computers have different resolutions and mouse speeds, the computers have different L's.

To resolve the problem of nonlinearity between a mouse signal and a cursor movement, content of each entry in Table 1 is (tick, times) (namely, a movement amount and a number of movements). If a mouse signal is sent by (1, 60), it indicates that tick=1 is sent for 60 times. (8, 20) represents that tick=8 is sent for 20 times. (0, 0) indicates returning the cursor to the starting point position on the screen.

Table 1 is a mouse test movement table of the horizontal-direction moving mouse speed table or vertical-direction moving mouse speed table, and the content in Table 1 is different values of the tick and times (1, 60), (2, 30), (4, 15), (8, 20), (16, 10), (32, 5), (64, 4), (128, 2), and (255, 1). In this embodiment, numerical values of the tick are distributed as binary key numerical values, but are not used to limit the technical features of the present invention, and the numerical values of the tick in any numerical value distribution manner is applicable to the present invention.

With reference to the content of the patent having the patent application Ser. No. 10/511,4284, in a case of recording or playing back a mouse behavior pattern, when a mouse behavior event instruction in a mouse behavior event file is executed, the recording, playback, and verification module 20 calculates, according to the average mouse movement distances in the horizontal-direction moving mouse speed table and the vertical-direction moving mouse speed table as shown in Table 1, mouse signals with a minimum number of sets of tick and times by using a distance between a destination position (namely, a destination position specified in the mouse behavior event instruction) and a current position (namely, a current position of the cursor on the screen) of the cursor. The recording, playback, and verification module 20 sends the calculated mouse signals having the minimum number of sets to the to-be-tested system 30 by using the USB apparatus simulator 24 to enable the to-be-tested system 30 to accurately and quickly move the cursor on the screen to the destination position in the mouse event according to the mouse signals.

FIG. 2A to FIG. 2D are schematic diagrams of moving a cursor on a screen according to a mouse speed table according to the present invention. FIG. 2A to FIG. 2D show horizontal-direction movements of the cursor on the screen, by means of which data of each mouse movement distance and each average mouse movement distance in the horizontal-direction moving mouse speed table as shown in Table 1 is established. The vertical-direction moving mouse speed table is also established in the same manner. Descriptions on establishing the vertical-direction moving mouse speed table are omitted herein.

Figure 2A:
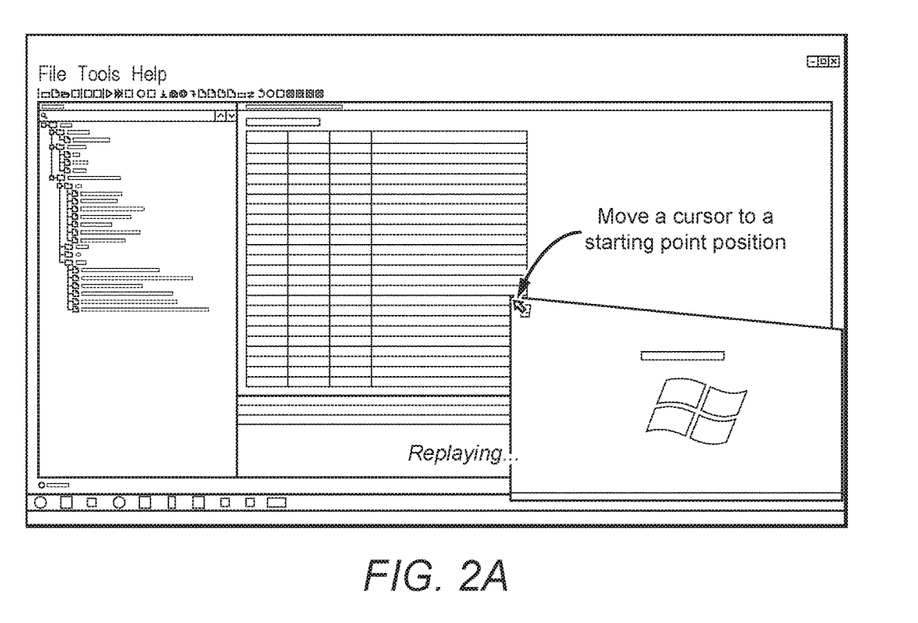
FIG. 2A to FIG. 2D are schematic diagrams of moving a cursor on a screen according to a mouse speed table according to the present invention.

In FIG. 2A, the recording, playback, and verification module 20 sends a mouse signal whose (tick, times) is (0, 0) to the to-be-tested system 30 by using the USB apparatus simulator 24, and the to-be-tested system 30 moves the cursor to a starting point position on an upper left corner of a window according to the mouse signal (0, 0).

The recording, playback, and verification module 20 sends an image capturing signal to the image capturing module 22, and the image capturing module 22 captures, on the to-be-tested system 30, a screenshot of moving the cursor to the starting point position on the upper left corner of the window and converts the screenshot into a screenshot image file of moving the cursor to the starting point position on the upper left corner of the window to send the screenshot image file to the recording, playback, and verification module 20.

Figure 2B:
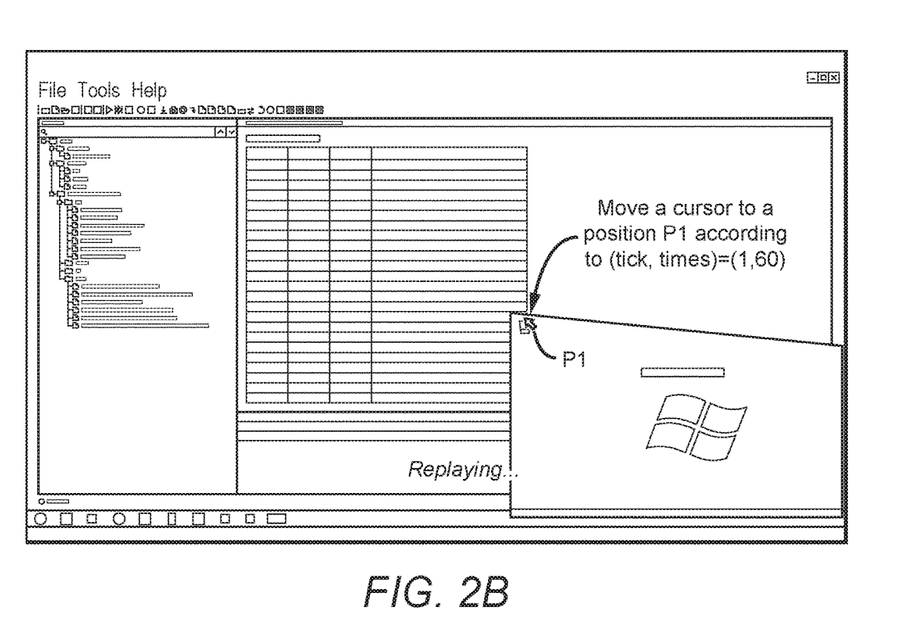

In FIG. 2B, the recording, playback, and verification module 20 sends, according to Table 1, a mouse signal whose (tick, times) is (1, 60) to the to-be-tested system 30 by using the USB apparatus simulator 24, and the to-be-tested system 30 moves the cursor in a horizontal direction to a position P1 of the window according to the mouse signal (0, 0).

When the cursor on the screen of the to-be-tested system 30 is moved in the horizontal direction to the position P1 of the window, the recording, playback, and verification module 20 sends an image capturing signal to the image capturing module 22, and the image capturing module 22 captures, on the to-be-tested system 30, a screenshot of moving the cursor in the horizontal direction to the position P1 of the window and converts the screenshot into a screenshot image file of moving the cursor in the horizontal direction to the position P1 of the window to send the screenshot image file to the recording, playback, and verification module 20.

The recording, playback, and verification module 20 performs comparison on all pixels in screenshot image files between the captured screenshot image file of moving the cursor in the horizontal direction to the position P1 of the window and the captured screenshot image file of moving the cursor to the starting point position on the left corner of the window. Pixels corresponding to the backgrounds in the two captured screenshot image files are the same, but a corresponding pixel in the screenshot image file where the cursor is at the position P1 is different from a corresponding pixel in the screenshot image file where the cursor is at the starting point position. Therefore, the pixels in the two captured screenshot image files may be subtracted from each other, the backgrounds corresponding to the same pixels in the two captured screenshot image files are removed, and cursor positions corresponding to different pixels in the two captured screenshot image files are reserved. Hence, the recording, playback, and verification module 20 performs calculation on the pixel corresponding to the position P1 and the pixel corresponding to the starting point position to obtain a mouse movement distance of L1 corresponding to (tick, times) that is (1, 60) in Table 1. The recording, playback, and verification module 20 divides the mouse movement distance L1 with the times that is 60 to obtain an average mouse movement distance of L1/60 corresponding to (tick, times) that is (1, 60) in Table 1. The recording, playback, and verification module 20 establishes a form corresponding to (tick, times) that is (1, 60) in Table 1 by using data such as the mouse movement distance of L1 and the average mouse movement distance of L1/60.

In the present invention, when a numerical value of the tick is extremely small, a distance by which the cursor on the screen is moved is also extremely small and is between integer pixels. Therefore, a numerical value of the times is increased to increase a distance by which the cursor on the screen is moved, and then, an average distance of moving the cursor on the screen is calculated.

Figure 2C:
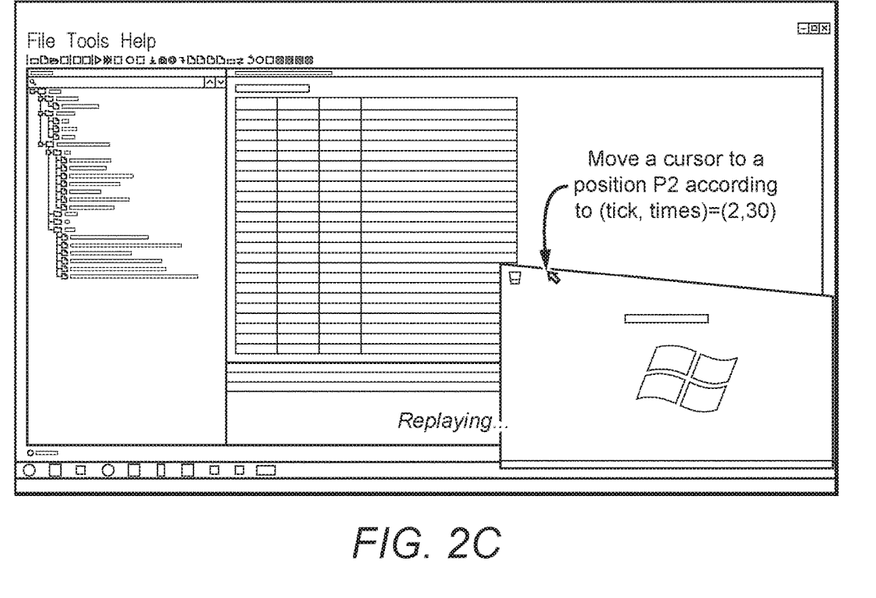
Figure 2D:
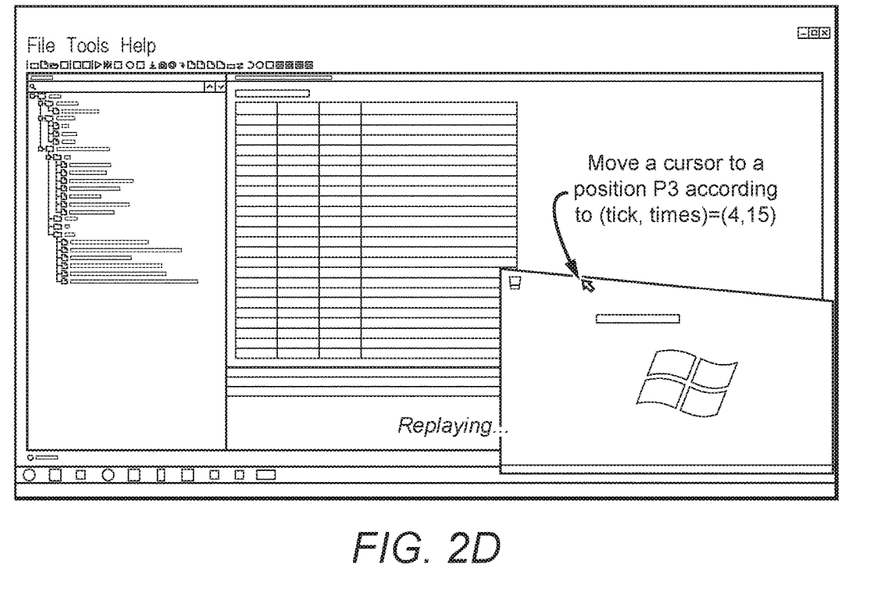

In FIG. 2C and FIG. 2D, the recording, playback, and verification module 20 sends, according to Table 1, mouse signals whose sets of (tick, times) are (2, 30) and (4, 15) separately to the to-be-tested system 30 by using the USB apparatus simulator 24, and the to-be-tested system 30 moves the cursor in the horizontal direction to positions P1 and P3 of the window according to the mouse signals (2, 30) and (4, 15).

When the cursor on the screen of the to-be-tested system 30 is moved in the horizontal direction to the positions P2 and P3 of the window separately, the recording, playback, and verification module 20 sends image capturing signals to the image capturing module 22, and the image capturing module 22 captures, on the to-be-tested system 30, screenshots of moving the cursor in the horizontal direction to the positions P2 and P3 of the window separately and converts the screenshots into screenshot image files of moving the cursor in the horizontal direction to the positions P2 and P3 of the window separately to send the screenshot image files to the recording, playback, and verification module 20.

The recording, playback, and verification module 20 performs comparison on all pixels in screenshot image files between the captured screenshot image files of moving the cursor in the horizontal direction to the positions P2 and P3 of the window separately and the captured screenshot image file of moving the cursor to the starting point position on the left corner of the window. The recording, playback, and verification module 20 performs calculation on pixels respectively corresponding to the positions P2 and P3 and a pixel corresponding to the starting point position to obtain mouse movement distances of L2 corresponding to (tick, times) that is (2, 30) and L3 corresponding to (tick, times) that is (4, 15) in Table 1. The recording, playback, and verification module 20 respectively divides the mouse movement distance L2 with the times that is 30 and the mouse movement distance L3 with the times that is 15 to obtain average mouse movement distances of L2/30 corresponding to (tick, times) that is (2, 30) and L3/15 corresponding to (tick, times) that is (4, 15) in Table 1. The recording, playback, and verification module 20 establishes forms corresponding to sets of (tick, times) that are (2, 30) and (4, 15) in Table 1 respectively by using the mouse movement distance of L2 and the average mouse movement distance of L2/30, as well as the mouse movement distance of L3 and the average mouse movement distance of L3/15.

As stated above, the recording, playback, and verification module 20 separately sends, according to Table 1, mouse signals whose sets of (tick, times) are (8, 20), (16, 10), (32, 5), (64, 4), (128, 2), and (255, 1) to the to-be-tested system 30 by using the USB apparatus simulator 24. The to-be-tested system 30 moves, according to the mouse signals, the cursor in the horizontal direction to respective destination positions in the window separately. The recording, playback, and verification module 20 performs calculation on pixels corresponding to the destination positions, to which the cursor is separately moved in the horizontal direction, of the window and the pixel corresponding to the starting point position to obtain mouse movement distances of L4, L5, L6, L7, L8, and L9 respectively corresponding to sets of (tick, times) that are (8, 20), (16, 10), (32, 5), (64, 4), (128, 2), and (255, 1) and average mouse movement distances of L4/20, L5/10, L6/5, L7/4, L8/2, and L9/1 in Table 1. The recording, playback, and verification module 20 establishes forms corresponding to the sets of (tick, times) in Table 1 by using data such as the mouse movement distances and average mouse movement distances.

Because to-be-tested systems 30 of different models or specifications have different associations between a screen resolution and a mouse speed, it is necessary to establish a horizontal-direction moving mouse speed table and a vertical-direction moving mouse speed table that are dedicated to the to-be-tested system 30, and the to-be-tested system 30 is detected, the cursor on the screen of the to-be-tested system 30 is accurately moved, according to the horizontal-direction moving mouse speed table and the vertical-direction moving mouse speed table, to a destination position specified in a mouse event.

Figure 3:
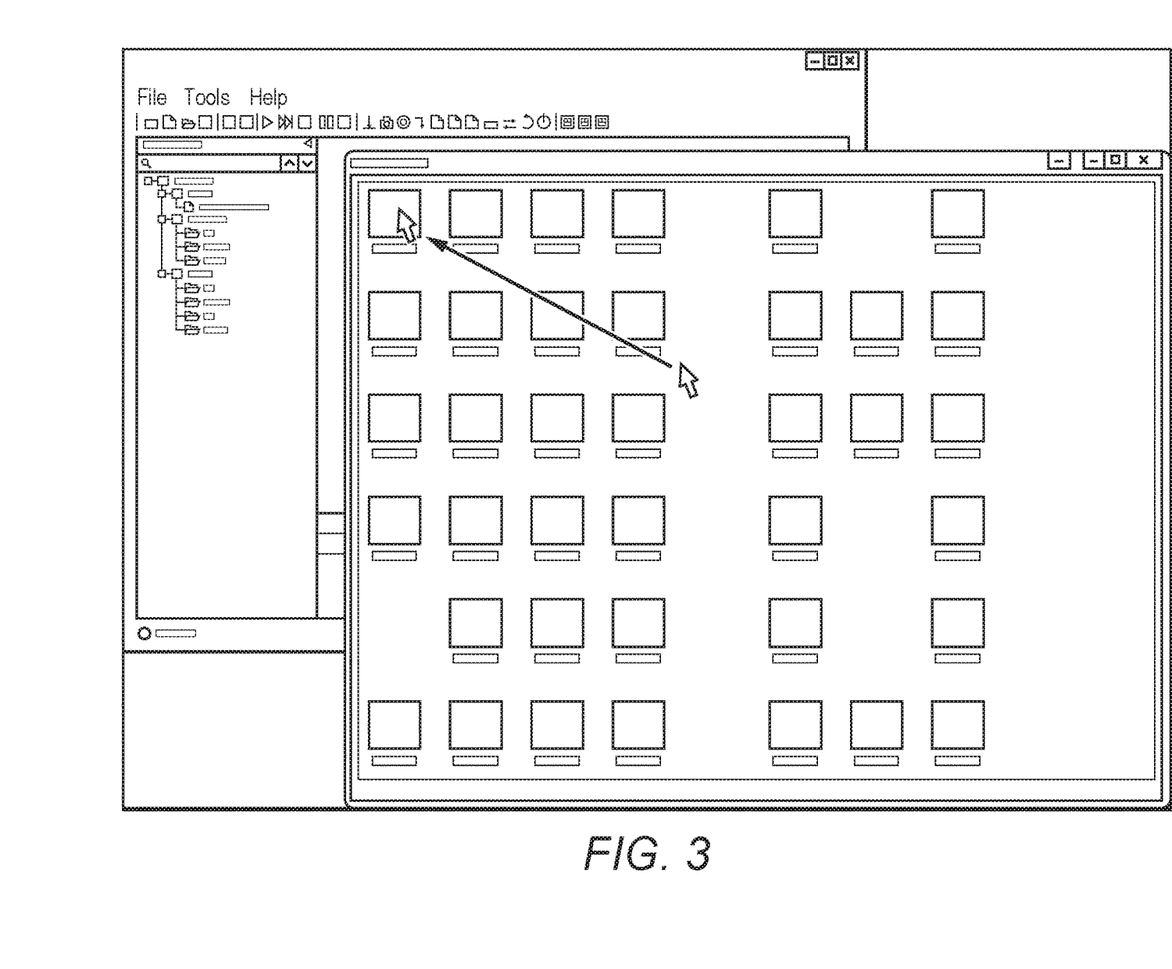
FIG. 3 is a schematic diagram of displaying an image of a to-be-tested system according to the present invention.

FIG. 3 is a schematic diagram of displaying an image of a to-be-tested system according to the present invention. The recording, playback, and verification module 20 executes a mouse behavior event instruction in a mouse behavior event file, and the recording, playback, and verification module 20 reads a specified destination position, to which the cursor on the screen of the to-be-tested system 30 moved, from the mouse behavior event instruction, for example, a position of an image "TeamViewer" in a screen shown in FIG. 3.

The recording, playback, and verification module 20 utilizes an image capturing processing technology to learn a current position of the cursor on the screen of the to-be-tested system 30, and the current position is a position that is slightly upper-left to the middle of the screen of the to-be-tested system 30.

The recording, playback, and verification module 20 calculates a distance D between a pixel corresponding to the destination position (namely, the position that is slightly upper-left to the middle of the screen in FIG. 3) of the cursor and a pixel corresponding to the current position (namely, the position of the image "TeamViewer" in the screen shown in FIG. 3) of the cursor.

Subsequently, the recording, playback, and verification module 20 calculates a minimum number of sets of tick and times of a horizontal-direction moving mouse speed table and a vertical-direction moving mouse speed table of moving the cursor to the destination position by using the following equations:

$$D/x = N (N \geq 1)$$

$$D = x \pmod{R}$$

where x refers to each average mouse movement distance in the horizontal-direction moving mouse speed table and the vertical-direction moving mouse speed table, and R is a remainder.

The recording, playback, and verification module 20 finds a distance D that is greater than the average mouse movement distances x in the horizontal-direction moving mouse speed table and the vertical-direction moving mouse speed table to perform calculation according the foregoing equations. For example, if it is assumed that the distance D is greater than an average mouse movement distance x corresponding to tick=255 (namely, L9/1), the distance D is divided by the average mouse movement distance x to obtain a numerical value of the times, N (assumed to be n1), and a remainder R, so as to obtain a mouse signal whose set of (tick, times)=(255, n1).

The remainder R is set to a distance D, and a distance D that is greater than average mouse movement distances x in the horizontal-direction moving mouse speed table and vertical-direction moving mouse speed table is further found to perform calculation according to the foregoing equations until the remainder is R less than the average mouse movement distance x=L1/60, for example, mouse signals whose sets of (tick, times) are (32, n2) and (2, n3) may be further obtained by using the foregoing equations.

As stated above, the recording, playback, and verification module 20 calculates the distance D according to the horizontal-direction moving mouse speed table and vertical-direction moving mouse speed table to obtain mouse signals having the minimum number of sets of (tick, times) that are (255, n1), (32, n2), and (2, n3) and sends the mouse signals having the minimum number of sets that are (255, n1), (32, n2), and (2, n3) to the to-be-tested system 30, so as to enable the to-be-tested system 30 to accurately and rapidly move, according to the mouse signals, the cursor on the screen from the position that is slightly upper-left to the middle of the screen shown in FIG. 3 in the horizontal direction and vertical direction to the position of the image "TeamViewer".

With reference to the drawings of FIG. 1 to FIG. 3 of the present invention, a flowchart of establishing and using a horizontal-direction moving mouse speed table and a vertical-direction moving mouse speed table in a mouse behavior recording mode and playing back mode, so as to accurately and rapid move the cursor on the screen to a destination position, in the present invention is described.

Figure 4:
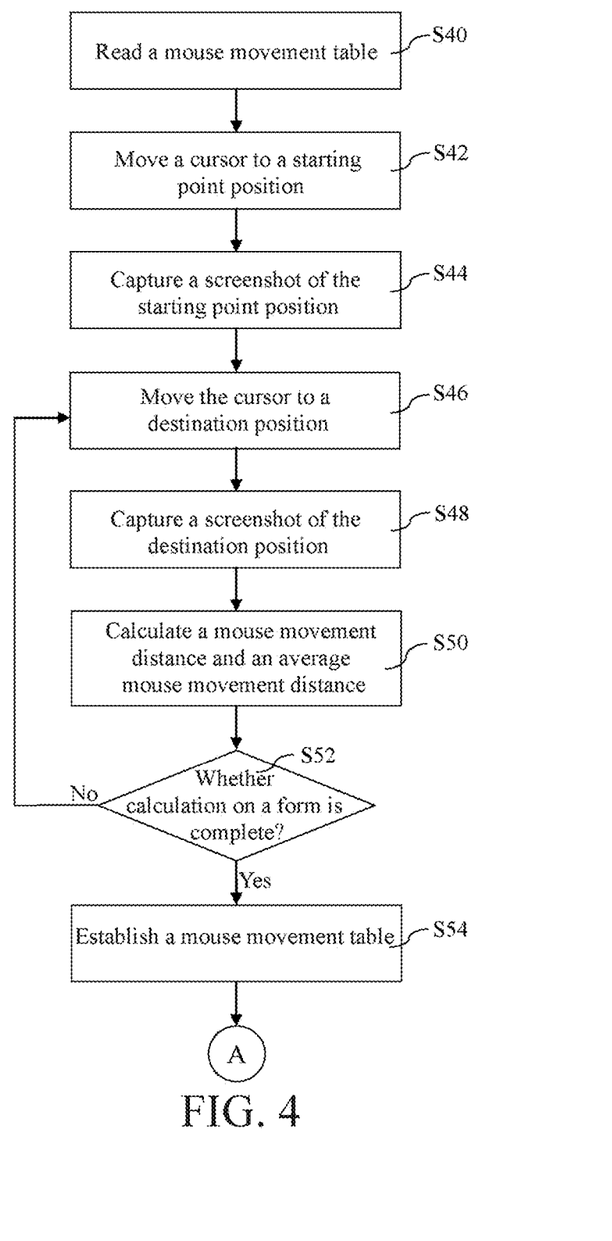
FIG. 4 is a flowchart of a method for measuring an association between a screen resolution and a mouse movement speed according to the present invention.

FIG. 4 is a flowchart of a method for measuring an association between a screen resolution and a mouse movement speed according to the present invention. In FIG. 4, a process of establishing a horizontal-direction moving mouse speed table is used as an illustrative example of a process establishing a mouse speed table, and a manner of establishing vertical-direction moving mouse speed table is the same as that of establishing the horizontal-direction moving mouse speed table, so the description thereof is omitted herein.

In FIG. 4, a recording, playback, and verification module 20 reads a horizontal-direction moving mouse speed table as shown in Table 1 (step S40) and also reads data of each set of (tick, times) in the horizontal-direction moving mouse speed table and establishes a mouse movement distance and an average mouse movement distance corresponding to each set of (tick, times) in the horizontal-direction moving mouse speed table using the following steps.

The recording, playback, and verification module 20 sends a starting point position to a to-be-tested system 30 by using a USB apparatus simulator 24 to move a cursor on a screen of the to-be-tested system 30 to the starting point position on an upper left corner as shown in FIG. 2A (step S42).

The recording, playback, and verification module 20 sends an image capturing signal to an image capturing module 22, and the image capturing module 22 captures, on the to-be-tested system 30, a screenshot of moving the cursor to the starting point position in FIG. 2A and converts the screenshot into a screenshot image file of moving the cursor to the starting point position to send the screenshot image file to the recording, playback, and verification module 20 (step S44).

The recording, playback, and verification module 20 sends a mouse signal of (tick, times)=(1, 60) in the horizontal-direction moving mouse speed table to the to-be-tested system 30 by using the USB apparatus simulator 24, and the to-be-tested system 30 moves the cursor on the screen to a position P1 in FIG. 2B according to the mouse signal of (tick, times)=(1, 60) (step S46).

The recording, playback, and verification module 20 sends an image capturing signal to the image capturing module 22, and the image capturing module 22 captures, on the to-be-tested system 30, a screenshot of moving the cursor to the position P1 in FIG. 2B and converts the screenshot into a screenshot image file of moving the cursor to the position P1 to send the screenshot image file to the recording, playback, and verification module 20 (step S48).

The recording, playback, and verification module 20 performs comparison on all pixels in screenshot image files between the captured screenshot image file of moving the cursor to the position P1 in FIG. 2B and the captured screenshot image file of moving the cursor to the starting point position in FIG. 2B. Pixels corresponding to the backgrounds in the two captured screenshot image files are the same, but a corresponding pixel in the screenshot image file where the cursor is at the position P1 is different from a corresponding pixel in the screenshot image file where the cursor is at the starting point position. Therefore, the pixels in the two captured screenshot image files may be subtracted from each other, the backgrounds corresponding to the same pixels in the two captured screenshot image files are removed, and cursor positions corresponding to different pixels in the two captured screenshot image files are reserved. Hence, the recording, playback, and verification module 20 performs calculation on the pixel corresponding to the position P1 and the pixel corresponding to the starting point position to obtain a mouse movement distance in the horizontal direction of L1 corresponding to (tick, times) that is (1, 60) in Table 1. The recording, playback, and verification module 20 divides the mouse movement distance L1 with the times that is 60 to obtain an average mouse movement distance of L1/60 corresponding to (tick, times) that is (1, 60) in Table 1 (step S50).

Determine whether calculation on data, such as all mouse movement distances and average mouse movement distances, in a horizontal-direction moving mouse movement table is complete (step S52). If the calculation on the data, such as all mouse movement distances and average mouse movement distances, in the horizontal-direction moving mouse movement table is not complete, steps S46 to S50 are repeated, so as to perform calculation to obtain data, such as mouse movement distances of L2, L3, L4, L5, L6, L7, L8, and L9 and average mouse movement distances of L2/30, L3/15, L4/20, L5/10, L6/5, L7/4, L8/2, and L9/1, of the horizontal-direction moving mouse movement table.

If the calculation on the data, such as all mouse movement distances and average mouse movement distances, in the horizontal-direction moving mouse movement table is complete, the recording, playback, and verification module 20 saves the data, such as the mouse movement distances and average mouse movement distances, into forms corresponding to respective sets of (tick, times) in Table 1, so as to establish a horizontal-direction moving mouse movement table (step S54).

Subsequently, the recording, playback, and verification module 20 executes, according to the foregoing established horizontal-direction moving mouse speed table and vertical-direction moving mouse speed table, an mouse behavior event instruction in a mouse behavior event file that serves as a subscript for test, so as to test the to-be-tested system 30. That is, the recording, playback, and verification module 20 tests the to-be-tested system 30 according to the horizontal-direction moving mouse speed table and vertical-direction moving mouse speed table that include sets of (tick, times), mouse movement distances, and average mouse movement distances (as shown in Table 1).

The recording, playback, and verification module 20 sends an image capturing signal to the image capturing module 22, and the image capturing module 22 captures, on the to-be-tested system 30, a screenshot of the cursor at a current position on the screen of the to-be-tested system 30, as shown in FIG. 3, the current position of the cursor is a position that is slightly upper-left to the middle of the screen, and the image capturing module 22 converts the screenshot into a screenshot image file of the cursor located at the position that is slightly upper-left to the middle of the screen to send the screenshot image file to the recording, playback, and verification module 20 (step S56).

The recording, playback, and verification module 20 reads a destination position of the mouse behavior event instruction from the mouse behavior event file. As shown in FIG. 3, the destination position is a position of the image "TeamViewer" (step S58).

The recording, playback, and verification module 20 calculates, according to the forgoing equations, mouse signals having a minimum number of sets of (tick, times) of the horizontal-direction moving mouse speed table and vertical-direction moving mouse speed table by using a distance between the destination position (corresponding to the position of the image "TeamViewer" in FIG. 3) and the current position (corresponding to the position of the cursor that is slightly upper-left to the middle of the screen in FIG. 3). As stated in the foregoing illustrative example, calculate mouse signals whose sets of (tick, times) are (255, n1), (32, n2), and (2, n3) (step S60).

The recording, playback, and verification module 20 sends mouse signals having the minimum number of sets of (tick, times) that are (255, n1), (32, n2), and (2, n3) of the horizontal-direction moving mouse speed table and vertical-direction moving mouse speed table to the to-be-tested system 30 by using the USB apparatus simulator 24, so as to enable the to-be-tested system 30 to accurately and rapidly move, according to the mouse signals, the cursor on the screen from the position that is slightly upper-left to the middle of the screen shown in FIG. 3 in the horizontal direction and vertical direction to the position of the image "TeamViewer" (step S62).

The foregoing method for measuring an association between a screen resolution and a mouse movement speed of the present invention may be implemented in a form of a program, and the program may be stored in a recording medium. After loading and executing the program on the recording medium, a system for measuring an association between a screen resolution and a mouse movement speed can implement the steps of the method as described in the foregoing and shown in the drawings.

Similarly, the foregoing method for measuring an association between a screen resolution and a mouse movement speed of the present invention may be implemented as a computer program product. After, for example, downloading the computer program product from a network and executing it, the system for measuring an association between a screen resolution and a mouse movement speed can implement the steps of the method as described in the foregoing and shown in the drawings.

The present invention provides a system and method for measuring an association between a screen resolution and a mouse movement speed, a recording medium, and a computer program product and characteristics thereof are that: in a case of not relating to an operating system platform, a mouse USB signal is simulated by using special hardware, an image processing and analyzing technology is used to calculate an accurate association between a screen resolution and a mouse movement speed by regularly moving the mouse and observing changes of a position of a mouse cursor, so as to achieve an object of accurately moving the mouse cursor to a specific position.

Although the present invention is described as above by referring to preferred embodiments and illustrative accompanying drawings, the present invention should be not considered to be limitative. Various modifications, omissions, and changes made by persons skilled in the art on forms and content of embodiments of the present invention all fall within the scope of the claims of the present invention.

REFERENCE SIGNS 20 recording, playback, and verification module
22 image capturing module
24 USB apparatus simulator
30 to-be-tested system

What is claimed is:

1. A method for measuring an association between a screen resolution and a mouse movement speed, wherein a recording, playback, and verification module executes a mouse behavior event instruction of a mouse behavior event file, comprising the following steps:
   A. reading, by the recording, playback, and verification module, a mouse speed table, wherein the mouse speed table comprises a plurality of sets of a movement amount and a number of movements;
   B. sending, by the recording, playback, and verification module, a starting point position to a to-be-tested system by using a Universal Serial Bus (USB) apparatus simulator to move a cursor on a screen of the to-be-tested system to the starting point position;
   C. sending, by the recording, playback, and verification module, an image capturing signal to an image capturing module, and capturing, by the image capturing module on the to-be-tested system, a screenshot of moving the cursor to the starting point position and converting the screenshot into a screenshot image file of moving the cursor to the starting point position to send the screenshot image file to the recording, playback, and verification module;
   D. sending, by the recording, playback, and verification module, a set of a movement amount and a number of movements in the mouse speed table to the to-be-tested system by using the USB apparatus simulator to enable the to-be-tested system to move, according to the set of a movement amount and a number of movements, the cursor on the screen to a destination position;
   E. sending, by the recording, playback, and verification module, an image capturing signal to the image capturing module, and capturing, by the image capturing module on the to-be-tested system, a screenshot of moving the cursor to the destination position and converting the screenshot into a screenshot image file of moving the cursor to the destination point position to send the screenshot image file to the recording, playback, and verification module;
   F. comparing, by the recording, playback, and verification module, the screenshot image file in which the cursor is moved to the starting point position with the screenshot image file in which the cursor is moved to the destination position, and learning, according to a movement distance of the cursor between the starting point position and the destination position, a mouse movement distance and an average mouse movement distance, corresponding to the set of a movement amount and a number of movements, of the movement distance, wherein each mouse movement distance is divided by a corresponding number of movements to obtain each average mouse movement distance;
   G. repeating step B to step F, so as to obtain and establish a mouse movement distance and an average mouse movement distance that correspond to each set of a movement amount and a number of movements in the mouse speed table; and
   H. executing, by the recording, playback, and verification module, the mouse behavior event instruction according to the mouse speed table, so as to test the to-be-tested system;
   wherein each of the recording, playback, and verification module and the image capturing module is implemented by a processor executing a non-transitory computer readable medium having stored thereon software instructions.

2. The method according to claim 1, wherein the step of H. executing, by the recording, playback, and verification module, the mouse behavior event instruction according to the mouse speed table, so as to test the to-be-tested system, further comprises the following steps:
   H1. sending, by the recording, playback, and verification module, an image capturing signal to the image capturing module, and capturing, by the image capturing module, a screenshot of the cursor at a current position on the screen of the to-be-tested system and converting the screenshot into a screenshot image file of the cursor at the current position to send the screenshot image file to the recording, playback, and verification module;
   H2. reading, by the recording, playback, and verification module, the destination position from the mouse behavior event instruction;
   H3. calculating, by the recording, playback, and verification module, a minimum number of the sets of a movement amount and a number of movements by using a distance between the destination position and the current position according to the average mouse movement distances in the mouse speed table; and
   H4. sending, by the recording, playback, and verification module, the calculated minimum number of the sets of a movement amount and a number of movements to the to-be-tested system by using the USB apparatus simulator to enable the to-be-tested system to move the cursor on the screen to the destination position.

3. The method according to claim 2, wherein: the recording, playback, and verification module reads and establishes a horizontal-direction moving mouse speed table and a vertical-direction moving mouse speed table, and the horizontal-direction moving mouse speed table and the vertical-direction moving mouse speed table respectively have the sets of a movement amount and a number of movements, the mouse movement distances, and the average mouse movement distances of horizontal direction movements and vertical direction movements.

4. The system according to claim 3, comprising:
H31. calculating, by the recording, playback, and verification module, minimum numbers of the sets of a movement amount and a number of movements of the horizontal direction movements and vertical direction movements separately by using the distance between the destination position and the current position of the cursor according to the average mouse movement distances in the horizontal-direction moving mouse speed table and the vertical-direction moving mouse speed table; and
H41. sending, by the recording, playback, and verification module, the calculated minimum numbers of the sets of a movement amount and a number of movements of the horizontal direction movements and vertical direction movements to the to-be-tested system by using a USB apparatus simulator to enable the to-be-tested system to move the cursor on the screen along a horizontal direction and a vertical direction to the destination position.

5. The system according to claim 3, comprising:
A1. reading, by the recording, playback, and verification module, a horizontal-direction moving mouse speed table and a vertical-direction moving mouse speed table, wherein the horizontal-direction moving mouse speed table and the vertical-direction moving mouse speed table respectively have the sets of a movement amount and a number of movements of horizontal direction movements and vertical direction movements;
D1. sending, by the recording, playback, and verification module, one set of a movement amount and a number of movements in each of the horizontal-direction moving mouse speed table and vertical-direction moving mouse speed table to the to-be-tested system by using the USB apparatus simulator to enable the to-be-tested system to move, according to the one set of a movement amount and a number of movements of the horizontal direction movements and the one set of a movement amount and a number of movements of the vertical direction movements, the cursor on the screen to the destination position;
G1. comparing, by the recording, playback, and verification module, the screenshot image file in which the cursor is moved to the starting point position with the screenshot image file in which the cursor is moved to the destination position, and learning, according to the movement distance of the horizontal direction movements and the movement distance of the vertical direction movements of the cursor between the starting point position and the destination position, a mouse movement distance and an average mouse movement distance of the movement distance of the horizontal direction movements and a mouse movement distance and an average mouse movement distance of the movement distance of the vertical direction movements that respectively correspond to the one set of a movement amount and a number of movements of the horizontal direction movements and the one set of a movement amount and a number of movements of the vertical direction movements.

6. The method according to claim 2, wherein the recording, playback, and verification module performs comparison on all pixels in the screenshot image files between the screenshot image files that are subsequently captured.

7. A system for measuring an association between a screen resolution and a mouse movement speed, comprising:
a recording, playback, and verification module, which reads a mouse speed table and outputs data in the mouse speed table to a to-be-tested system;
an image capturing module, electrically connected to the recording, playback, and verification module and the to-be-tested system; and a USB apparatus simulator, electrically connected to the recording, playback, and verification module and the to-be-tested system;
wherein the recording, playback, and verification module, the image capturing module, and the USB apparatus simulator execute the method according to claim 1.

* * * * *